US012355186B2

(12) United States Patent
Moncher

(10) Patent No.: US 12,355,186 B2
(45) Date of Patent: Jul. 8, 2025

(54) COUPLING HALF FOR AN ELECTRIC PLUG COMPRISING A MULTI-PART, ROTATABLE SLEEVE, AS WELL AS ELECTRIC PLUG AND METHOD

(71) Applicant: TE Connectivity Industrial GmbH, Neiderwinkling (DE)

(72) Inventor: Philipp Moncher, Niederwinkling (DE)

(73) Assignee: TE Connectivity Industrial GmbH, Niederwinkling (DE)

( * ) Notice: Subject to any disclaimer, the term of this patent is extended or adjusted under 35 U.S.C. 154(b) by 407 days.

(21) Appl. No.: 17/748,476

(22) Filed: May 19, 2022

(65) Prior Publication Data

US 2022/0278486 A1 Sep. 1, 2022

Related U.S. Application Data

(63) Continuation of application No. PCT/EP2020/082384, filed on Nov. 17, 2020.

(30) Foreign Application Priority Data

Nov. 19, 2019 (EP) .................................... 19210069

(51) Int. Cl.
*H01R 13/62* (2006.01)
*H01R 13/506* (2006.01)
(Continued)

(52) U.S. Cl.
CPC ......... *H01R 13/625* (2013.01); *H01R 13/506* (2013.01); *H01R 13/6271* (2013.01);
(Continued)

(58) Field of Classification Search
CPC ........................... H01R 13/625; H01R 13/506; H01R 13/6271; H01R 13/641; H01R 43/26;
(Continued)

(56) References Cited

U.S. PATENT DOCUMENTS 3,609,632 A * 9/1971 Vetter .................. H01R 13/623 439/258
3,854,789 A * 12/1974 Kaplan ................ H01R 9/0521 439/584

(Continued)

FOREIGN PATENT DOCUMENTS

DE 102005026148 B4 6/2012
JP S63164183 U 10/1988

(Continued)

OTHER PUBLICATIONS

Extended European Search Report, Application No. 19210069.1-1201, Dated: May 6, 2020, 8 pages.

(Continued)

*Primary Examiner* — Abdullah A Riyami
*Assistant Examiner* — Nelson R. Burgos-Guntin
(74) *Attorney, Agent, or Firm* — Barley Snyder

(57) ABSTRACT

One aspect of the invention relates to a coupling half (1) for an electric plug (2), which is configured for coupling to a further coupling half (3) of the electric plug (1), comprising a housing (4) and comprising a contact carrier (7) for electric contacts, the contact carrier (7) being arranged in the housing (4), and comprising a sleeve (8), which is separate from the housing (4) and which is arranged on the housing (4) to be threadlessly rotatable, wherein the sleeve (8) forms a connector (**8*a*) of the coupling half (1) for connecting to the further coupling half (3), wherein the sleeve (8) comprises an outer sleeve (9), which is threadlessly rotatably arranged on the housing (4), and the sleeve (8) comprises an inner sleeve (15), which is separate from the outer sleeve (9), wherein the inner sleeve (15) is arranged on the outer sleeve (9) and the inner sleeve (15) is movable in the direction of a longitudinal axis (A) of the coupling half (1**) relative to the (Continued)

housing (4) and to the outer sleeve (9). One aspect relates to an electric plug (2). One aspect relates to a method.

14 Claims, 3 Drawing Sheets

(51) Int. Cl.
*H01R 13/625* (2006.01)
*H01R 13/627* (2006.01)
*H01R 13/641* (2006.01)
*H01R 43/26* (2006.01)
*H01R 13/623* (2006.01)

(52) U.S. Cl.
CPC ........... *H01R 13/641* (2013.01); *H01R 43/26* (2013.01); *H01R 13/623* (2013.01)

(58) Field of Classification Search
CPC ......................... H01R 13/623; H01R 13/6277; H01R 24/005; H01R 13/6278
See application file for complete search history.

(56) References Cited

U.S. PATENT DOCUMENTS 4,285,564 A * 8/1981 Spinner ................ H01R 13/622 439/321
5,944,556 A * 8/1999 Wlos .................... H01R 9/0521 439/583
6,113,429 A * 9/2000 Weigel ............... H01R 13/6276 439/607.41
6,364,681 B1 4/2002 Watanabe
6,976,872 B1 * 12/2005 Wild .................. H01R 13/5205 439/578
7,568,934 B1 * 8/2009 Williams ........... H01R 13/6277 439/271
7,806,714 B2 * 10/2010 Williams ............. H01R 13/622 439/352
8,079,868 B2 12/2011 Stone et al.
8,764,473 B2 7/2014 Komatsubara
10,553,990 B2 * 2/2020 Grimm .................. H01R 13/59
11,824,295 B2 * 11/2023 Moncher ................ H01B 11/08
2007/0145744 A1 * 6/2007 Mehnert .............. H01R 13/622 285/333
2009/0088018 A1 * 4/2009 Nickol ................. H01R 13/622 439/372
2011/0034054 A1 * 2/2011 Schuster .............. G01R 33/385 439/312
2012/0015539 A1 * 1/2012 Schmitt ................ H01R 13/622 439/312
2013/0023146 A1 * 1/2013 Andresen ......... H01R 13/65914 29/525.11
2013/0164986 A1 * 6/2013 Staudigel ............... H01R 13/50 439/626
2013/0203280 A1 * 8/2013 Greub .................. H01R 13/623 439/350
2013/0224989 A1 * 8/2013 Giefers .................. H01R 13/59 174/650
2013/0295793 A1 * 11/2013 Shaw ................... H01R 13/622 439/578
2014/0134871 A1 * 5/2014 Jozwik ................. H01R 13/622 439/350
2014/0162488 A1 * 6/2014 Staudigel ................. H01R 9/03 439/372
2015/0050827 A1 * 2/2015 Chang ................ H01R 13/6275 439/312
2016/0268737 A1 * 9/2016 Gutmann ............. G01D 11/245
2018/0054026 A1 * 2/2018 Nolting .................. H01R 43/24
2019/0020149 A1 1/2019 Wu et al.
2019/0089092 A1 * 3/2019 Grimm .............. H01R 13/5845
2019/0148861 A1 * 5/2019 Ross ................... E21B 17/0285 166/65.1
2019/0157800 A1 * 5/2019 Völker ................. G02B 6/3849
2019/0360579 A1 * 11/2019 Hannet .................... F16H 57/08
2020/0169038 A1 * 5/2020 Wendt .................. H01R 13/639
2020/0300042 A1 * 9/2020 Peters ...................... E21B 7/067
2020/0353959 A1 * 11/2020 Aquino De Oliveira .................... H01R 13/447
2020/0358219 A1 * 11/2020 Pillard ................. H01R 13/642
2021/0281022 A1 * 9/2021 Moncher ................ H01R 24/28
2022/0123489 A1 * 4/2022 Moncher ................ H01R 24/86
2022/0271472 A1 * 8/2022 De Bruijn .......... H01R 13/6273
2022/0320794 A1 * 10/2022 Bertsch ................ H01R 13/625

FOREIGN PATENT DOCUMENTS

JP 2000182702 A 6/2000
JP 2011228212 A 11/2011
JP 2012059398 A 3/2012
JP 2014013683 A 1/2014
JP 2017045597 A 3/2017
WO 2017033725 A1 3/2017
WO 2019192654 A1 10/2019

OTHER PUBLICATIONS

PCT Search Report, Application No. PCT/EP2020/082384, Dated: Dec. 7, 2020, 11 pages.
Examination Report from the European Patent Office dated Apr. 24, 2023, corresponding to Application No. 19 210 069.1-1201, 6 pages.
Japanese Office Action dated Sep. 5, 2023 with English translation, corresponding to Application No. 2022-528228, 11 pages.

* cited by examiner

COUPLING HALF FOR AN ELECTRIC PLUG COMPRISING A MULTI-PART, ROTATABLE SLEEVE, AS WELL AS ELECTRIC PLUG AND METHOD

CROSS REFERENCE TO RELATED APPLICATIONS

This application is a continuation of PCT International Application No. PCT/EP2020/082384 filed Nov. 17, 2020, which claims priority under 35 U.S.C. § 119 to EP 19210069.1, filed Nov. 19, 2019.

FIELD OF THE INVENTION

The invention is related to an electrical connecter an more particularly to a coupling for an electrical connector.

BACKGROUND

From the DE 10 2005 026 148 B4 a plug connector coupling is known. There the electric plug comprises two separate coupling halves. These are coupled to one another in a nondestructively releasable way. The first coupling half has a housing. On this housing a singlepiece sleeve is arranged to be capable of being rotated. The sleeve and the housing are arranged fixed relative to each other in the direction of a longitudinal axis of this first coupling half. However, the sleeve can be rotated relative to the housing about this longitudinal axis. For connecting the two coupling halves these are guided in the direction of the longitudinal axis and thus axially into one another. For this purpose a front part of the second coupling half is pushed into the sleeve. The electric plug comprises a fast locking device. This fast locking device comprises radially inwardly oriented bars arranged on the sleeve. These bars engage behind locking means when axially bringing together the two coupling halves. These locking means are formed on an outer side of a front part of the second coupling half. These locking means are bars, which are azimuthally orientated around the longitudinal axis. Upon rotating the sleeve thus also a relative movement of the radial bars on the sleeve relative to these locking means is effected. Since these bars directly contact these locking means, an axial pulling towards each other of the two coupling halves occurs. This is the case because the locking means have an inclined contact surface, along which the bars of the sleeve are guided, if the sleeve is rotated in the azimuthal direction. Thereby then a locked state of the two coupling halves is achieved.

However, in this embodiment azimuthal tolerances may be unacceptable. This can result in the coupled final state between the coupling halves not being finally achieved. This is the case if the sleeve is not rotated far enough about the longitudinal axis to actually achieve the completely coupled final state or the final position.

It is the object of the present invention among other objects, to provide a coupling half for an electric plug, which is of an improved setup with regard to the sleeve and upon coupling to the further coupling half of the electric plug allows for an improved achieving of the coupled final state. In particular it is the object to at least reduce an azimuthal tolerance with regard to the rotated final position of the sleeve for achieving the coupled final position of the two coupling halves. This means that for an electric plug the coupled final state between the two coupling halves should be safely achieved.

SUMMARY

A coupling half for an electric plug is configured for coupling to a further coupling half of the electric plug that is separate therefrom. The coupling half has a housing. Moreover, the coupling half comprises a contact carrier for electric contacts. This contact carrier is in particular configured to be separate from the housing. The contact carrier is arranged in the housing. Moreover, the coupling half has a sleeve that is separate from the housing. This sleeve is threadlessly rotatably arranged on the housing. This means that the holding or the arranging of the sleeve on the housing is effected without a thread. Nevertheless the sleeve is arranged in such a way on the housing that it can be rotated relative to the housing about a longitudinal axis of the coupling half. The sleeve forms a connector of the coupling half for direct connecting with the further coupling half. In particular thus the sleeve is that component which causes the direct coupling with the further coupling half.

BRIEF DESCRIPTION OF THE DRAWINGS

Embodiments of the invention are explained in more detail in the following by reference to drawings of which.

In the figures, same elements or elements having the same function, are equipped with the same reference signs.

DETAILED DESCRIPTION OF THE EMBODIMENT(S)

Figure 1:
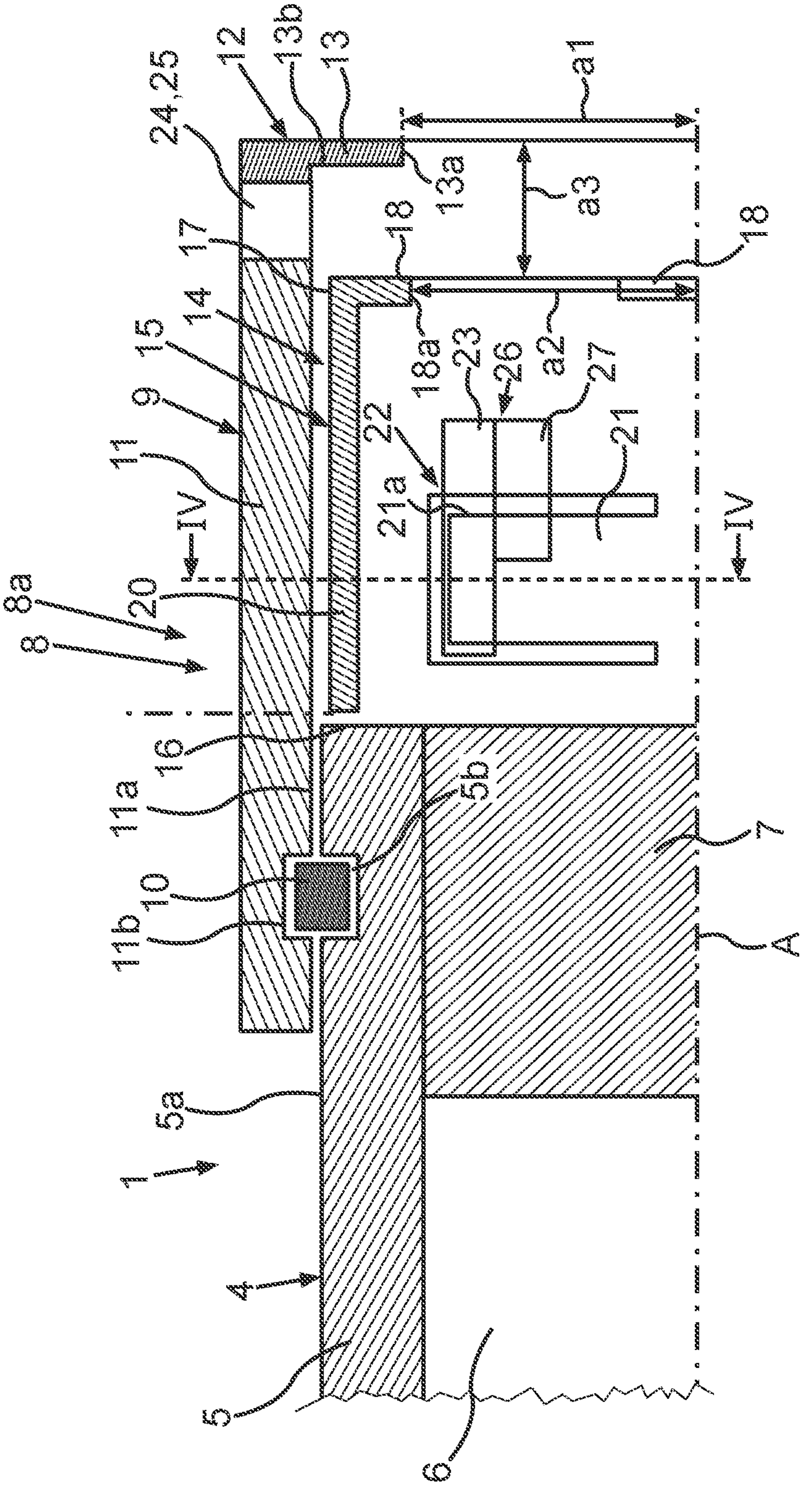
FIG. 1 a cross sectional view of an embodiment of a coupling half according to the invention, wherein the coupling half is only represented by a partial region with reference to a longitudinal axis.
Figure 2:
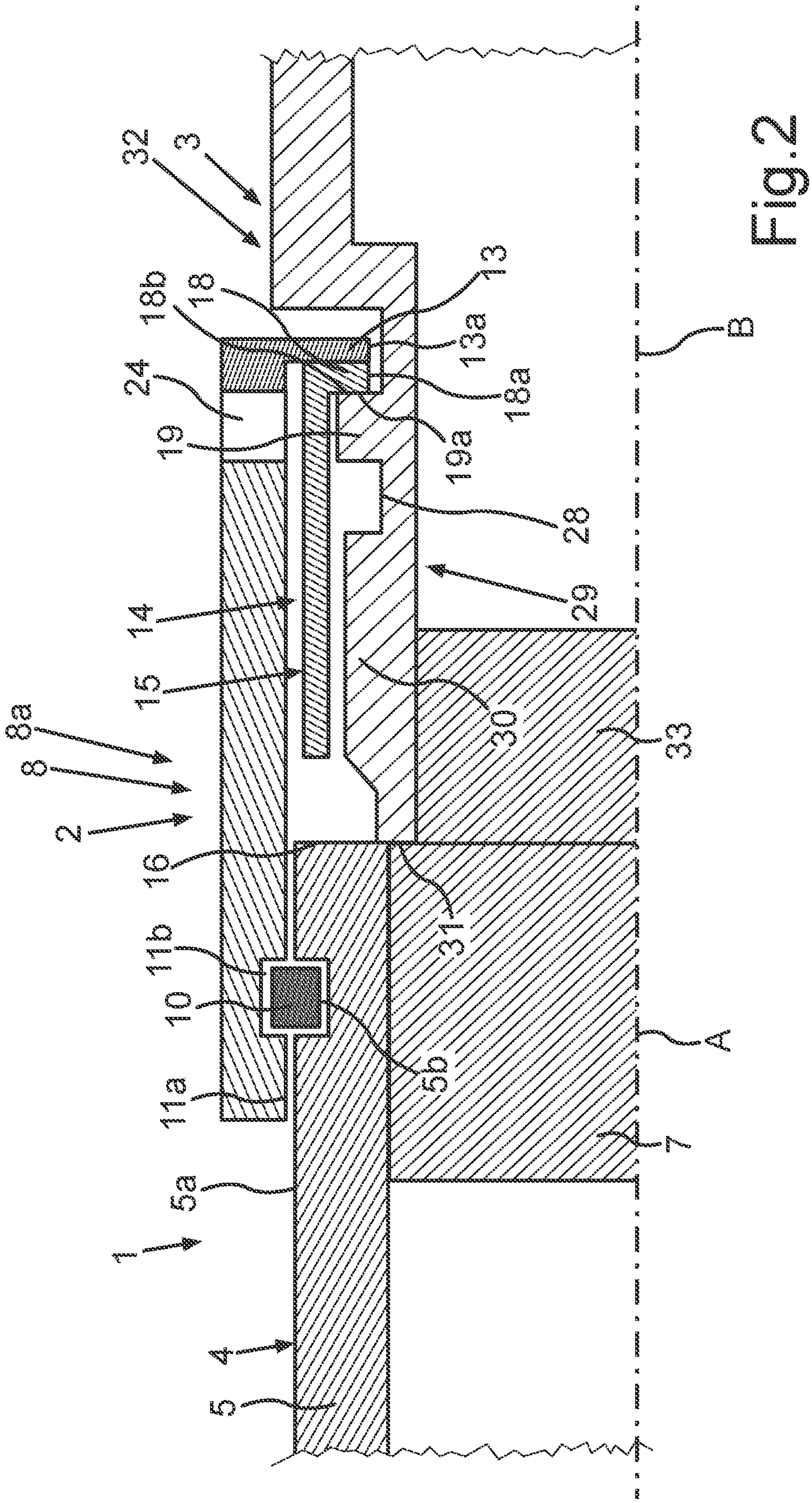
FIG. 2 a sectional view through an embodiment of an electric plug, in which the first coupling half according to FIG. 1 is shown with a second coupling half of the electric plug, which is separate thereto, in a coupled final position.
Figure 3:
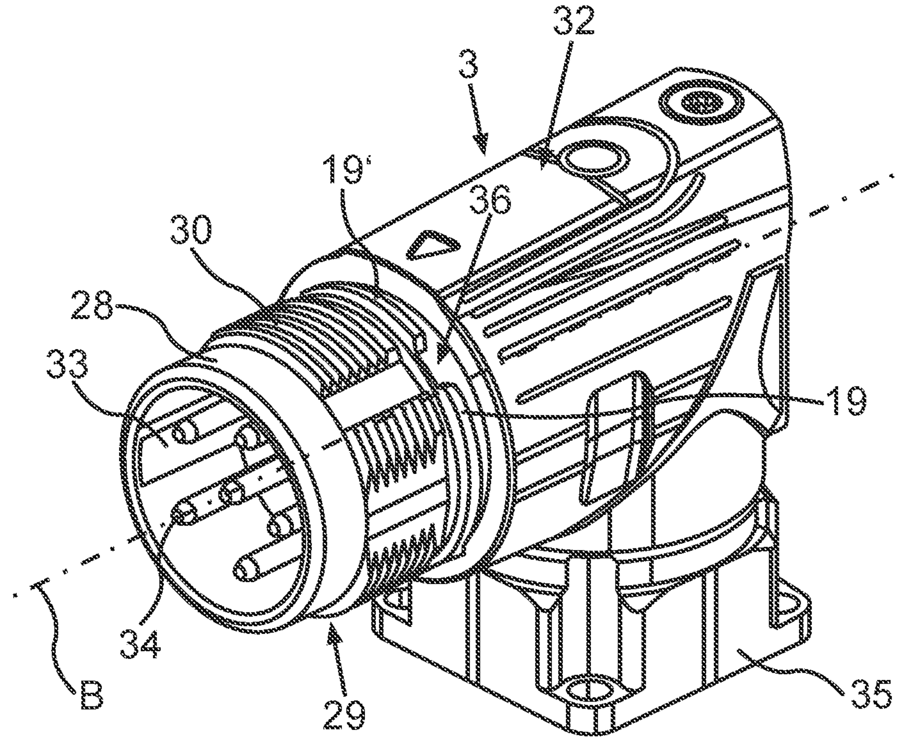
FIG. 3 a perspective view of an embodiment of a second coupling half of the electric plug.

In FIG. 1 in a cross-sectional view a coupling half 1 for an electric plug 2 (FIG. 2) is shown. The sectional view is formed in a vertical plane, which comprises a longitudinal axis A of the first coupling half 1. In FIG. 1 only the top half of the coupling half 1 with regard to the longitudinal axis A is shown. The first coupling half 1 is configured for coupling to a second coupling half 3 (FIG. 2 and FIG. 3). In this connection a non-destructively releasable coupling between the first coupling half 1 and the second coupling half 3 is facilitated.

The first coupling half 1 comprises a housing 4. The housing 4 in the embodiment is shown as hollow cylinder. This housing 4 is rigid. It is configured in particular to be made of metal. In FIG. 1 the first coupling half 1 is merely shown in a partial region above the longitudinal axis A. The first coupling half 1 is configured to be circumferentially extending around the longitudinal axis A, in particular configured to be completely circumferentially closed. For this purpose the housing 4 is configured to extend circumferentially around the longitudinal axis a. The longitudinal axis A thus also forms the central axis of this housing 4, which is configured as hollow cylinder. The housing 4 in this connection in particular has a wall 5. The wall 5 is in particular the hollow cylinder wall. In an interior 6 of the housing 4 in one design a contact carrier 7 is arranged. The contact carrier 7 is a component that is separate from the housing 4. The contact carrier 7 is configured for receiving electric contacts (not shown). The electric contacts can be pin contacts. The electric contacts, however, can also be contact sockets for inserting electric pin contacts, which are pins. The contact carrier 7 is in particular made of plastic.

The first coupling half 1 moreover comprises a sleeve 8. The sleeve 8 is configured to be separate from the housing 4. The sleeve 8 is arranged directly on the housing 4. The sleeve 8 is arranged on the housing 4 to be movable relative thereto. The sleeve 8 comprises an outer sleeve 9. The outer sleeve 9 is configured in particular as hollow cylinder. The outer sleeve 9 is arranged directly on the housing 4. In particular the outer sleeve 9 is arranged to be threadlessly rotatable on the housing 4. This means that the outer housing 9 and the housing 4 are not connected with each other by a screw thread. In particular the outer sleeve 9 is arranged to be threadlessly rotatable by a snap ring 10 on the housing 4. For this purpose on an outer side 5*a* of the wall 5 of the housing 4 an in particular radially circumferential groove 5*b* is formed. Therein the snap ring 10 is received. On an inner side 11*a* of a wall 11 of the outer sleeve 9 a groove 11*b* is formed. The wall 11 is also an outer wall such as the wall 5. The wall 11 is a hollow cylinder wall. The snap ring 10 radially extends into this groove 11*b*. By this mechanical connection the outer sleeve 9 is arranged on the housing 4 in axially fixed position. A relative movement between the housing 4 and the outer sleeve 9 in the direction of the longitudinal axis A thus is in particular prevented or essentially avoided. A movement in this axial direction can thus at best be effected via the clearance of the snap ring 10 in the grooves 5*b* and 11*b*. The sleeve 8 forms a mechanical connector 8*a*. This is configured for direct coupling with the second coupling half 3.

As can moreover be recognized, the outer sleeve 9 viewed in the axial direction and thus in the direction of the longitudinal axis A is arranged to overlap with the housing 4. In particular the outer sleeve 9 surrounds the housing 4 on the circumferential side. The outer sleeve 9 thus comprises a larger inner diameter than is the outer diameter of the housing 4.

In an advantageous embodiment the outer sleeve 9 on a front edge 12 comprises a stop 13 projecting inwardly perpendicular to the longitudinal axis A. The stop 13 can be configured in azimuthal direction and thus completely closed in the circumferential direction around the longitudinal axis A. However, it may also be that this stop 13 is configured to be interrupted in the circumferential direction around the longitudinal axis A. Thus in the circumferential direction of the longitudinal axis A several stop segments of the stop 13 can be configured. By this stop 13 the receiving space 14 in the interior of the outer sleeve 9 is limited. In this receiving space 14, which can also be referred to as radial groove on the inner side 11*a*, an inner sleeve 15 of the sleeve 8 is arranged. The inner sleeve 15 is a component that is separate from the outer sleeve 9. The inner sleeve 15 viewed in the direction perpendicular to the longitudinal axis A thus extends into this receiving space 14. The inner sleeve 15 thus viewed in the direction perpendicular to the longitudinal axis A is arranged to be overlapping with this stop 13. In particular the inner sleeve 15 is configured as hollow cylinder. The inner sleeve 15 is configured as a single piece. The inner sleeve 15 can for instance be formed from sheet metal.

The outer sleeve 9 can for instance be configured to be made from metal. The outer sleeve 9 can for instance be a zinc pressure die casting. The outer sleeve 9, however, can also for instance be made from plastic. For example it can be an injection-molded component.

In an advantageous embodiment the inner sleeve 15 in axial direction is arranged to be adjacent to a front edge 16 of the housing 4. The inner sleeve 15 in all positions in the axial direction is arranged in particular without any overlap with the housing 4. The inner sleeve 15 is thus arranged in a row with the housing 4. The inner sleeve 15 viewed in the axial direction is arranged across its entire length within the outer sleeve 9. The inner sleeve 15 is not directly mechanically attached to the housing 4. The inner sleeve 15 is in particular only mechanically attached to the outer sleeve 9. This is also effected by receiving the inner sleeve 15 in the receiving space 14. By the stop 13 the inner sleeve 15 in the axial direction is also received in the outer sleeve 9 in such a way that it is secured against dropping out. An axial slipping out of the inner sleeve 15 from the outer sleeve 9 is thus prevented.

The inner sleeve 15 on its front edge 17 comprises at least one coupling nose 18. The coupling nose 18 is a nose that projects radially inwardly towards the longitudinal axis A. The coupling nose 18 is configured for direct coupling with a coupling bar 19 (FIG. 2) of the second coupling half 3. Preferably the inner sleeve 15 comprises several coupling noses 18, in particular three coupling noses 18. These coupling noses 18 viewed in the circumferential direction around the longitudinal axis A are arranged equidistantly to each other.

It may be that a radial distance a1 between the front side 13*a* of the stop 13 positioned radially inside is equal to a distance a2. The distance a2 is the radial distance between a front side 18*a* of a coupling nose 18 positioned radially inside and the longitudinal axis A. However, it may also be that the distance a1 is larger than the distance a2. It is of the essence that the stop 13 viewed in the direction perpendicular to the longitudinal axis A is invariably configured to be large enough for a corresponding radial overlap with a wall 20, which is a hollow cylinder wall, of the inner sleeve 15 to be formed.

Moreover the inner sleeve 15 comprises a guiding part 21. The guiding part 21 is configured to be integrally formed with the inner sleeve 15. The guiding part 21 is integral part of a guide 22. By the guide 22 the relative movement between the inner sleeve 15 and the outer sleeve 9 is guided. In particular this guiding part 21 is a spring. For instance this can be a leaf spring. In particular this guiding part 21 is configured to be resilient in the radial direction. The guide 22 moreover comprises a further guiding part 23. This guiding part 23 is in particular a recess. In particular this is an axial straight-lined recess. For instance this can be configured to be groove-like or furrow-like. In this guiding part 23 a piece 21*a* of the other guiding part 21 engages. This piece 21*a* can for instance be a radially outwardly formed hump. Thus a radial engaging between the guiding parts 21 and 23 to is formed.

By this guide 22 the axial guiding of the inner sleeve 15 is achieved relative to the outer sleeve 9. Moreover by this guide 22 in an advantageous embodiment an azimuthal movement coupling between the inner sleeve 15 and the outer sleeve 9 is achieved. This means that, when the sleeve 8 is rotated about the longitudinal axis A relative to the housing 4, the outer sleeve 9 and the inner sleeve 15 are movement-coupled. Thus, when the outer sleeve 9 is touched by a user and correspondingly rotated about the longitudinal axis A, the inner sleeve 15, which is positioned inside and cannot be touched by a user, is automatically rotated along. In particular the guiding part 23 can be a first guiding part. In particular the guiding part 21 can be a second guiding part.

The inner sleeve 15 is arranged or mounted on the outer sleeve 9 to be movable relative thereto. The inner sleeve 15 in defined manner is axially movable relative to the outer sleeve 9 and also to the housing 4.

As can be seen moreover in FIG. 1, the outer sleeve 9 has a viewing window 24. The viewing window 24 is formed in the wall 11. The viewing window 24 is a radial through-hole. Through this hole 24 it can be looked into the receiving space 14 from outside the sleeve 8.

In FIG. 1 the first coupling half 1 is shown in a basic position. This means that it is arranged in uncoupled state with the second coupling half 3. In this basic position the inner sleeve 15 is arranged in an axial basic position. This axial basic position 15 is the position, in which the inner sleeve 15 is arranged with its front edge 17 spaced from the stop 13. In this regard a distance a3 is formed. In particular this is the axial maximum distance between the inner sleeve 15 and the stop 13. In this basic position the inner sleeve 15 viewed in the axial direction is configured to be without any overlap with the viewing window 24. This means that, when looking from outside the sleeve 8 through the viewing window 24 into the receiving space 14 the inner sleeve 15 cannot be recognized. It is thus in this regard shifted far enough in the direction of the housing 4 for it not to be recognized through the viewing window 24.

By this viewing window 24 thus an integrated optical feedbacker 25 is formed. By this optical feedbacker 25 from outside the outer sleeve 9 both a coupled as well as an uncoupled state between the two coupling halves 1 and 3 can be viewed.

In an advantageous embodiment, which can be in addition to or instead of this optical feedbacker 25, the first coupling half 1 comprises a haptic feedbacker 26. For this purpose the embodiment that in the inner side 11*a* for instance a second recess 27 is formed. This recess 27 in an advantageous embodiment is axially orientated. In an advantageous embodiment viewed in the circumferential direction about the longitudinal axis A it is configured directly extending adjacent to this guiding part 23. In particular this recess 27 in the axial direction is shorter than the guiding part 23. Preferably the axial length of the recess 27 is at least large enough for receiving the axial dimensions of the piece 21*a*.

With this haptic feedbacker 26 a haptic signal is generated, when the coupled final position between the two coupling halves 1 and 3 is reached.

The guide 22 is also configured in such a way that it forms an azimuthal holding force, by which the outer sleeve 9 and the inner sleeve 15 when rotating about the longitudinal axis A are coupled in their movement. In particular by this azimuthal holding force a force threshold value is predetermined in a defined way. This is the case to the effect that in the case of an azimuthal rotary force acting upon the outer sleeve 9 and exceeding the force threshold value, the rotary coupling between the outer sleeve 9 and the inner sleeve 15 is uncoupled in a defined way. Thus in the case the force threshold value is exceeded by an azimuthal rotary force the piece 21*a* in the azimuthal direction snaps out from the guiding part 23 and snaps into the recess 27. By this process a haptic signal is generated, which can be perceived by a user, in particular when grasping the outer sleeve 9. In particular when this snapping over of the piece 21*a* from the guiding part 23 into the recess 27 is effected, then also the coupled final position between the two coupling halves 1 and 3 is generated. Thus by this haptic feedbacker 26 also a clear haptic signal is generated, which clearly allows for recognizing the reached coupled final position.

In FIG. 2 in a corresponding sectional view as in FIG. 1 the entire electric plug 2 is shown. Here it is only shown with the top half with regard to the longitudinal axes A, B. Here the coupled final position between the first coupling half 1 and the second coupling half 3 is shown. As can here be seen, the inner sleeve 15 in the axial direction relative to the outer sleeve 9 is shifted to the front. The inner sleeve 15 in the axial direction is arranged to overlap with the viewing window 24. When viewing through the viewing window 24 from outside, then the inner sleeve 15 can be recognized. Also thereby then the coupled final position is optically recognizable. Moreover it can be recognized that the front edge 17, in particular the coupling nose 18, with a front side directly contacts a rear side 13*b* of the stop 13. Moreover a rear side 18*b* of the coupling nose 18 is directly in contact with a front side 19*a* of the coupling bar 19. The coupling bar 19 in this connection represents an embodiment for a locking means. This locking means is configured as a single piece on an outer side 28 of a front part 29 of the second coupling half 3. On this outer side 28 additionally also a thread 30 can be formed. In particular viewed in the circumferential direction about the longitudinal axis B of the second coupling half 3 several separate coupling bars 19 are formed. This is also shown in FIG. 3. In this regard a coupling bar 19 and a coupling bar 19' can be recognized. Preferably three separate coupling bars are formed on this outer side 28.

As can be seen in FIG. 2, in which the coupled final position between the coupling halves 1 and 3 is represented, the coupling nose 18 in the axial direction is jammed between the stop 13 and the coupling bar 19. Moreover, it can also be recognized that the front edge 16 of the housing 4 is in contact with a front edge 31 of a housing 32 of the second coupling half 3. Here a metallic contact between the front edges 16 and 31 is formed.

In particular the second coupling half 3 comprises a contact carrier 33 (FIG. 3). Same is inserted into the housing 32. The contact carrier 33 can be made of plastic. It is for receiving electric contacts 34, as this is shown in FIG. 3. The electric contacts 34 can be pin contacts. However, they can also be contact sockets for such pin contacts.

In FIG. 2 the position of the inner sleeve 15 axially maximally shifted towards the front is shown. In this coupled final position according to the view in FIG. 2 the piece 21*a* is also snapped over from the guiding part 23 into the recess 27, when the recess 27 is present in an advantageous embodiment.

Preferably the sleeve 8 starting from a basic position can be rotated by maximally 90° about the longitudinal axis A in order to reach the coupled final position between the two coupling halves 1 and 3.

In particular by the sleeve 8 in particular the coupling nose 18 and the locking means in the form of the coupling bars 19, 19' a fast locking is formed. In particular here a bayonet locking can be configured. The corresponding bayonet parts are formed by the coupling noses 18 and the coupling bars 19, 19'. Preferably the front side 19*a* of the coupling bar 19 are not arranged in a plane oriented perpendicular to the longitudinal axis B. Rather this front 19*a* is slightly tilted. It can be a helix-shaped partial winding. Thus in the circumferential direction about the longitudinal axis B of the second coupling half 3 it comprises a certain pitch. Accordingly, this is configured in the advantageously given further coupling bars 19' etc.

In FIG. 3 in a perspective view an embodiment of the second coupling half 3 is shown. In particular the second coupling half 3 can be an angle half. This means that a connector part 35 of the second coupling half 3 is arranged at an angle, in particular 90°, on the front part 21, which is provided for coupling to the first coupling half 1. To the connector part 35 other components can be connected.

As can be recognized in FIG. 3, in the circumferential direction about the longitudinal axis B between two adjacent coupling bars 19, 19' an azimuthal gap 36 is formed.

When coupling the two coupling halves 1 and 3, these are guided towards each other in the axial direction and thus in the direction of their longitudinal axes A and B. Therein the first coupling halves 1 with their sleeves 8 are slid over the front part 29. In particular in this state the stop 13 and the coupling nose 18 are arranged to overlap in the azimuthal direction about the longitudinal axis A. In particular the first coupling half 1 is oriented in such a way relative to the second coupling half 3 that the stop 13 and the coupling nose 18 approaching from the front are pushed through the gap 36 and thus in the axial direction past the coupling bars 19 and 19'. If this state is then reached, the sleeve 8 is rotated about the longitudinal axis A. In this connection the coupling nose 18 in the circumferential direction is rotated about the longitudinal axis A relative to the coupling bars 19, 19'. Therein a coupling nose 18 engages behind for instance the coupling bar 19. The rear side **18*b* of the coupling nose 18 in this connection slides directly along the front side 19*a*. Due to the advantageous tilted position of this front side 19*a* in this azimuthal movement the inner sleeve 15 is pulled in its axial final position and thus away from the housing 4. When generating this coupled final position due to this rotating and contacting of the rear side 18*b* and the front side 19*a* the rotary force for the sleeve 8 is successively increased. If then the rotary force is larger than the force threshold value, the piece 21*a* snaps out of the first guiding part 23 in azimuthal direction and snaps into the recess 27**.

If the stop 13 has a radial inward extension, which is larger than the radial height to of a coupling bar 19, 19', the stop 13 cannot be configured to be fully circumferential. This is because then a sliding over or a pushing through the gap 36 would no longer be possible. If thus in an embodiment the stop 13 is configured to be fully circumferential and uninterrupted, the radial extension of this stop 13 is smaller than the height of the coupling bars 19, 19'. In an above-explained alternative embodiment, as it is shown in FIG. 1 and FIG. 2, the stop 13 extends radially further inward. In such an embodiment the stop 13 is interrupted in the circumferential direction around the longitudinal axis A. It is then configured to consist of several stop segments. These preferably have an azimuthal width, which in particular corresponds to the azimuthal width of the coupling noses 18. Thus, one pair each form between a coupling nose 18 and a stop segment of the stop 13, which are each configured to be overlapping in the circumferential direction around the longitudinal axis A, in particular fully overlapping. Thus then in this basic position one pair each formed of a stop segment and a coupling nose 18 can be pushed through a corresponding gap 36 in the axial direction. This azimuthal width between a stop segment of the stop 13 and a coupling nose 18 is dimensioned such that when then rotating between the inner sleeve 15 and the outer sleeve 19, in particular when snapping over the piece **21*a* from the guiding part 23 into the recess 27, also in the coupled final position shown in FIG. 2** an azimuthal overlap between a stop segment and the assigned coupling nose is configured.

Figure 4:
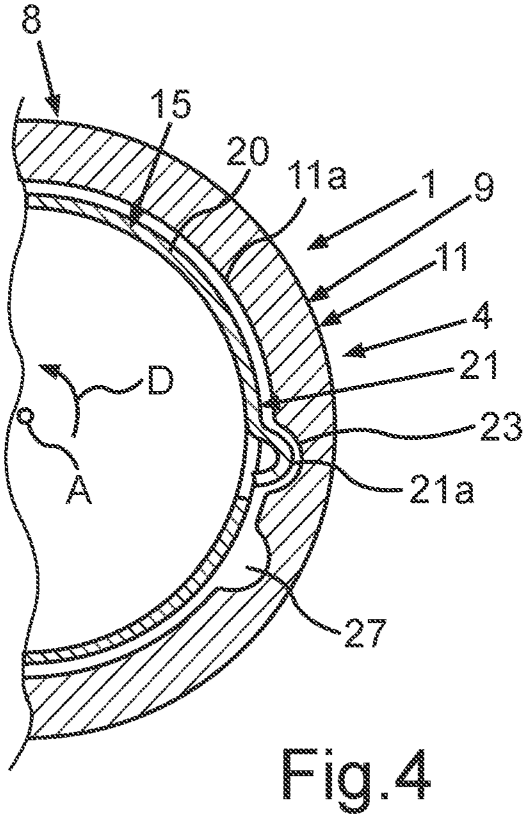
FIG. 4 a sectional view perpendicular to a longitudinal axis of the first coupling half, wherein in this regard the section is formed schematically by a sleeve of the first coupling half and the sleeve is represented only in a partial region.

In FIG. 4 in a schematic sectional view perpendicular to the longitudinal axis A an embodiment of the first coupling half 1 is shown. The section in FIG. 1 is formed along the section line IV-IV. It is thus generated by the guiding 22. In this embodiment it can be recognized that the piece **21*a* is inserted radially outwardly into this guiding part 23**. The rotational direction D about the longitudinal axis A, which is perpendicular to the figure plane, is drawn in.

In an alternative embodiment it may be that this guiding part 23 is not a radially outwardly facing recess in the inner side **11*a* but an elevation that is inwardly oriented towards the longitudinal axis A. In the case of such an embodiment the other guiding part 21, in particular the piece 21*a*, then is configured to be complementary. This piece 21** then preferably represents a groove or recess curved in the direction towards the longitudinal axis A.

Further features of the invention are apparent from the claims, the figures and the description of figures. The features and feature combinations mentioned above in the description as well as the features and feature combinations mentioned below in the description of figures and/or shown in the figures alone are usable not only in the respectively specified combination, but also in other combinations without departing from the scope of the invention. Thus, implementations are also to be considered as encompassed and disclosed by the invention, which are not explicitly shown in the figures and explained, but arise from and can be generated by the separated feature combinations from the explained implementations. Implementations and feature combinations are also to be considered as disclosed, which thus do not comprise all of the features of an originally formulated independent claim. Moreover, implementations and feature combinations are to be considered as disclosed, in particular by the implementations set out above, which extend beyond or deviate from the feature combinations set out in the back-references of the claims.

What is claimed is:

1. A coupling half (1) comprising:

a housing (4) and;

a contact carrier (7) being arranged in the housing (4), and having a sleeve (8), the sleeve being separate from the housing (4) and arranged on the housing (4) to be threadlessly rotatable, the sleeve (8) forms a connector (**8*a*) of the coupling half (1) for connecting to the further coupling half (3), the sleeve (8) comprises an outer sleeve (9), which is threadlessly rotatably arranged on the housing (4), and an inner sleeve (15), which is separate from the outer sleeve (9), the inner sleeve (15) being arranged on the outer sleeve (9) and being movable in the direction of a longitudinal axis (A) of the coupling half (1) relative to the housing (4) and to the outer sleeve (9**).

2. The coupling half (1) according to claim 1, further comprising a guide 22 located between the outer sleeve (9) and the inner sleeve (15) and through which the axial relative movement between the outer sleeve (9) and the inner sleeve (15) is guided.

3. The coupling half (1) according to claim 2, wherein the guide (22) comprises a first guiding part (23), which is arranged on an inner side (**11*a*) of the outer sleeve (9), and a second guiding part (21), which is arranged on the inner sleeve (15), wherein the first guiding part (23) and the second guiding part (21**) engage one another in the direction perpendicular to the longitudinal axis (A).

4. The coupling half (1) according to claim 3, wherein the guiding parts (21, 23) are axially orientated and radially directed grooves.

5. The coupling half (1) according to claim 4, wherein the guiding parts (21, 23) comprise a coupling geometry which are complementary to each other.

6. The coupling half (1) according to claim 5, wherein at least one of the guiding parts (21, 23) is resilient in the direction perpendicular to the longitudinal axis (A).

7. The coupling half (1) according claim 6, wherein the guide (22) applies an azimuthal retention force during rotation of the outer sleeve (9) and the inner sleeve (15) about the longitudinal axis (A) and whereby a rotary coupling is broken when the azimuthal retention force exceeds a force threshold value.

8. The coupling half (1) according to claim 7, wherein a haptic feedbacker (26) is formed by the guide, through which a coupled final position of the two coupling halves (1, 3) is haptically perceivable, wherein the final position is reached when releasing the rotary coupling and by releasing the rotary coupling a haptic signal is generated.

9. The coupling half (1) according to claim 8 wherein the outer sleeve (9) comprises a viewing window (24), which is oriented perpendicular to the longitudinal axis (A) and which is capable of being passed completely through the wall (11) of the outer sleeve (9), wherein by the viewing window (24) an optical feedbacker (25) is configured, through which from outside the outer sleeve (9) a coupled final position of the two coupling halves (1, 3) can be viewed.

10. The coupling half (1) according to claim 9 wherein the outer sleeve (9) comprises a front edge (12), wherein the front edge (12) comprises a stop (13) projecting inwardly perpendicularly to the longitudinal axis (A), wherein the inner sleeve (15) viewed in the direction perpendicular to the longitudinal axis (A) is received in the outer sleeve (9) to overlap with the stop (13) and/or a front edge (17) of the inner sleeve (15) is arranged axially spaced from the stop (13) in a basic position of the inner sleeve (15) and in a coupled final position of the two coupling halves (1, 3) the front edge (17) directly contacts a rear side (13*b*) of the stop (13).

11. The coupling half (1) according to claim 10 wherein the inner sleeve (15) comprises a front edge (17), wherein on the front edge (17) is arranged at least one coupling nose (18) for coupling to a coupling bar (19, 19') arranged on the second coupling half (3), the coupling nose (18) being arranged inwardly projecting in the direction perpendicular to the longitudinal axis (A).

12. The coupling half (1) according to claim 11 wherein the inner sleeve (15) viewed in the direction of the longitudinal axis (A) is shorter than the outer sleeve (9) and the inner sleeve (15) both in an uncoupled basic position as well as in a coupled final position.

13. The coupling half (1) according to claim 12 wherein the inner sleeve (15) viewed in the direction of the longitudinal axis (A) is arranged without any overlap with the housing (4) and when viewed in the direction perpendicular to the longitudinal axis (A) the wall (20) of the inner sleeve (15) is arranged to overlap with the wall (5) of the housing (4).

14. A method for coupling of a first coupling half (1) of an electric plug (2) with a second coupling half (3) of the electric plug (2), which comprises the following steps:

providing a first coupling half (1) comprising a housing (4) and a sleeve (8) that is threadlessly rotatably arranged thereon and said sleeve (8) comprises an outer sleeve (9) and an inner sleeve (15) that is separate from the outer sleeve (9), providing a second coupling half (3);

axial slipping of the first coupling half (1) over the second coupling half (3) so that the sleeve (8) of the first coupling half (1) axially overlaps with a front part (29) of a housing (32) of the second coupling half (3);

coupling a coupling structure (18) formed on an inner sleeve (15) of the sleeve (8) and comprising a counter coupling structure (19, 19') formed on an outer side (28) of the front part (29), rotating an outer sleeve (9) of the sleeve (8) about a longitudinal axis (A) of the first coupling half (1) and thereby rotating the inner sleeve (15) along with the outer sleeve (9);

causing an axial shifting of the inner sleeve (15) due to the axial relative movement between the coupling structure (18) and the counter coupling structure (19, 19') engaging the coupling structure (18), wherein the axial relative movement of the coupling structure (18) and the counter coupling structure (19, 19') is generated by the rotating of the sleeve (8);

reaching a coupled final position of the coupling halves (1, 3), when the inner sleeve (15) has reached an axial final position.

* * * * *